United States Patent [19]

LaBorde et al.

[11] 4,412,792
[45] Nov. 1, 1983

[54] INTENSIFIER PUMP WITH INTEGRATED CHECK VALVE

[75] Inventors: Russell G. LaBorde, Shorewood; Gary S. Jendrzejek, Milwaukee, both of Wis.

[73] Assignee: The Oilgear Company, Milwaukee, Wis.

[21] Appl. No.: 227,168

[22] Filed: Jan. 21, 1981

[51] Int. Cl.³ ............................................. F04B 21/00
[52] U.S. Cl. ................................ 417/454; 137/454.4; 137/454.6; 137/512.2; 137/512.3; 137/516.29; 417/571
[58] Field of Search ............ 60/591; 137/515.7, 454.4, 137/454.6, 512.2, 512.3, 516.29; 417/454, 571

[56] References Cited

U.S. PATENT DOCUMENTS

| | | | |
|---|---|---|---|
| 1,659,817 | 2/1928 | Halvorsen | 417/454 |
| 2,206,356 | 7/1940 | Hutchings | 137/515.7 |
| 3,309,014 | 3/1967 | Bauer | 417/571 |
| 3,346,008 | 10/1967 | Scaramucci | 137/515.7 |
| 3,447,836 | 6/1969 | Doerfler | 60/591 |
| 3,532,014 | 10/1970 | Franz | 83/53 |
| 3,746,483 | 7/1973 | Hindel | 417/571 |
| 3,749,122 | 7/1973 | Gold | 137/515.7 |
| 3,846,049 | 11/1974 | Douglas | 417/404 |
| 4,159,755 | 7/1979 | Kang | 60/591 |

FOREIGN PATENT DOCUMENTS

| | | | |
|---|---|---|---|
| 149708 | 5/1951 | Australia | 92/8 |
| 2824184 | 12/1979 | Fed. Rep. of Germany | 417/571 |
| 1152415 | 6/1956 | France | 60/591 |
| 940594 | 10/1963 | United Kingdom | 137/516.29 |

Primary Examiner—Abraham Hershkovitz
Attorney, Agent, or Firm—Weber, Raithel, Malm, LaFave & Backus

[57] ABSTRACT

A high pressure check valve for an intensifier cylinder and secured in the end of the cylinder so as to reduce the stress on the check valve due to cyclic loading.

2 Claims, 7 Drawing Figures

INTENSIFIER PUMP WITH INTEGRATED CHECK VALVE

BACKGROUND OF THE INVENTION

Check valves employed to deliver high pressure fluid on the order of 60,000 psi from the cylinder of a reciprocating intensifier pump frequently have failed very early due to fatigue stress due to cyclic loading pressures.

SUMMARY OF THE INVENTION

The high pressure intensifier cylinder of the present invention delivers high pressure fluid through a check valve that is constructed to minimize the geometric stress raiser and is mounted in the end of the cylinder in a manner effective to reduce the stress of cyclic pressures, so as to materially extend the useful like of the high pressure check valve.

A check valve assembly comprising the high pressure check valve also comprises a low pressure check valve for the admission of low pressure fluid to the intensifier cylinder.

The check valve has a coaxial bore for delivery of high pressure fluid whic up to the valve seat subjects the valve to cyclic loading, and beyond the valve seat subjects the valve to a substantially constant high pressure.

As will be apparent from a description herein of an embodiment of the invention, the tension forces of cyclic hydraulic pressure within the delivery bore of the check valve which create the fatigue stresses are opposed by other forces to reduce and minimize the fatigue stresses.

The intensifier cylinder comprises an outer steel cylinder, a stainless steel cylinder as a liner within the outer steel cylinder, and a bronze sleeve within the stainless steel cylinder. The bronze sleeve serves as a spacer in the cylinder and receives the pumping pistons for reciprocating therein.

The check valve assembly presents an inclined annular surface that abuts a similarly inclined surface of the end of the cylinder, and the end head for the cylinder, abuts the check valve assembly and is axially secured to compress the inclined surfaces of the cylinder and check valve assembly firmly together, so that the bore through the check valve sees a radial component of the axial compressive force.

The high pressure check means is positioned within the bore so the valve seat lies within the plane of the annular mating surfaces. Thus the radial component of compressive force seen by the bore is located at the valve seat which is an area otherwise vulnerable to fatigue stresses.

A portion of the check valve assembly that extends within the intensifier cylinder, is surrounded by internal pressure to also oppose the internal pressure forces of expansion within the coaxial bore.

Advantages of the invention are that the arrangement requires fewer parts, is more compact, requires less seals, employs metal to metal seals, is more economical to make and to maintain, and less likely to encounter fatigue failure as intensifier check valves have heretofore.

It is an object of the invention to provide a reciprocating intensifier pump with check valve means therefore being integrated in the end of the intensifier cylinder: in a manner to secure it in sealing engagement therewith; and so arranged to greatly reduce fatigue stress on the check valve.

Another object of the invention is to provide a check valve as an insert in the bore of an intensifier cylinder with rigid sealing means fitted therebetween to be normally easily removable, which under high internal pressure resiliently expands to positively seal against the valve insert and the bore of the cylinder to prevent leakage of fluid therebetween.

Other object and advantages will be apparent from the following description and appended claims.

DRAWINGS

DESCRIPTION OF THE INVENTION

Figure 1:
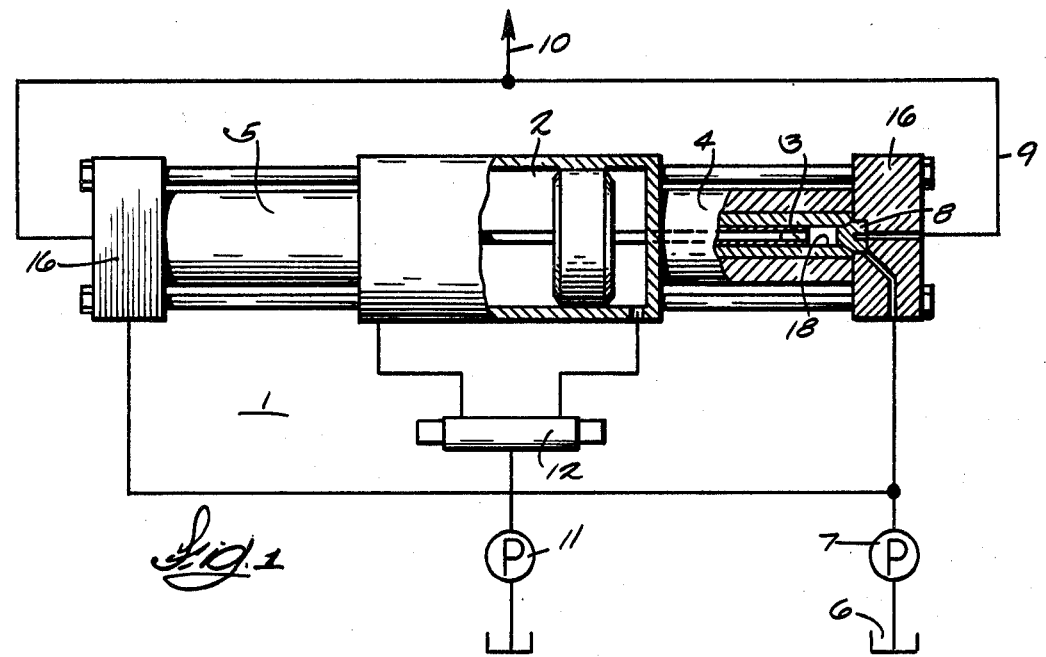
FIG. 1 is a general illustration of a hydraulically operated intensifier pump with a delivery end portion shown in section.

With reference to the drawings, a reciprocating intensifier pump 1, FIG. 1, comprises a linear double acting hydraulic motor 2 to drive a pair of reciprocating pumping pistons 3 in pump cylinders 4,5. The pump cylinders 4,5, may be referred to as intensifier cylinders, during a suction stroke of their pistons 3 receive a fluid from a low pressure supply source, such as a reservoir 6 and pump 7, and during a pumping stroke compress such fluid and deliver the compressed fluid through a check valve 8 and line 9 to a common delivery line 10 to a container or to a jet cutting device, not shown, as may be desired.

The hydraulic motor 2 is driven in any conventional manner such as by motive fluid from a hydraulic pump 11 whose delivered fluid is alternately directed to opposite ends of the hydraulic motor 2 by a reversing valve 12 controlled in a suitable manner.

Figure 2:
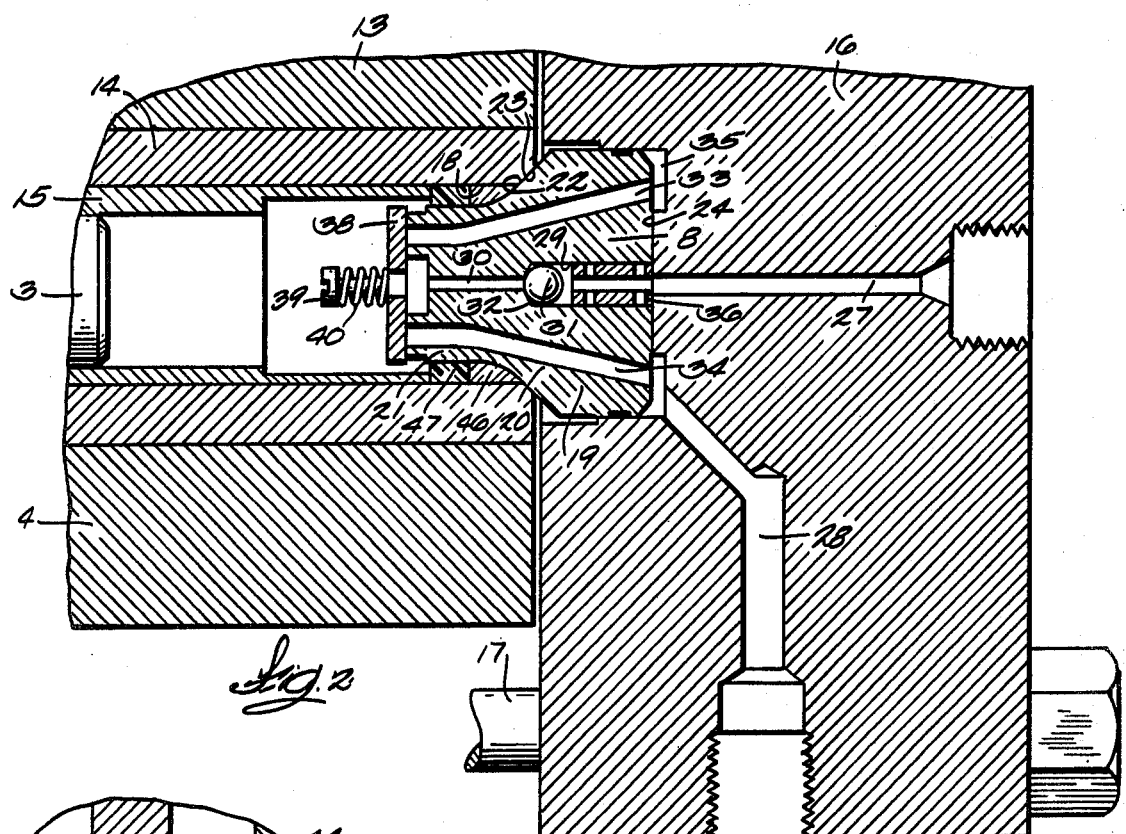
FIG. 2 is an enlarged view in section of the end portion of FIG. 1 showing the valve insert in the end of the cylinder.

The intensifier cylinder 4 preferably comprises an outer member 13, FIG. 2 of low alloy steel, a liner 14 of stainless steel making an interference fit preferably by a duplex shrink within the outer member, and a bronze liner 15 that makes a slip fit within the stainless steel liner. The bronze liner 15 receives the pumping piston 3 with a close fit therebetween, the clearance being on the order of 0.015 inch. The piston 3 is guided by a bushing fixed in the end of the hydraulic motor 2. The bronze liner 15 also serves as a spacer for the high pressure seals at the check valve end of the cylinder.

An end head 16 for each cylinder is secured thereto by a plurality of circumferentially spaced bolts 17 which extend axially through a flange of the hydraulic motor 2 and are torqued tightly to axially compress the valve insert 8 against the bore of the cylinder 4.

The valve assembly 8 comprises a valve body having a large and a small annular end portions 19, 21 and an intermediate annular portion 20 having an inclined surface 22 that joins the surfaces of portions 19, 21. The annular surface 22 is preferably inclined at 45 degrees to the adjoining surfaces.

The bore 18 of the cylinder 4 receiving the check valve at its delivery end, also has an inclined annular tapered surface 23 inclined at an angle corresponding to the annular tapered surface 22 of the check valve. The check valve has its annular tapered surface 22 in abutment with the annular tapered surface 23 of the cylinder 4.

The end head 16 has a large coaxial recess 24 for fitting over the valve insert. The bottom of the recess abuts the end of the valve insert to compress it, when the bolts 17 are tightened, and compress the annular tapered surfaces 22, 23 in axial abutment.

The end head 16 has a high pressure fluid passage 27, FIG. 2, coaxial to the valve 8 and cylinder 4 for connection to line 9, FIG. 1; and has an inlet passage 28 for connection to the source of supply fluid 7,6.

Figure 4:
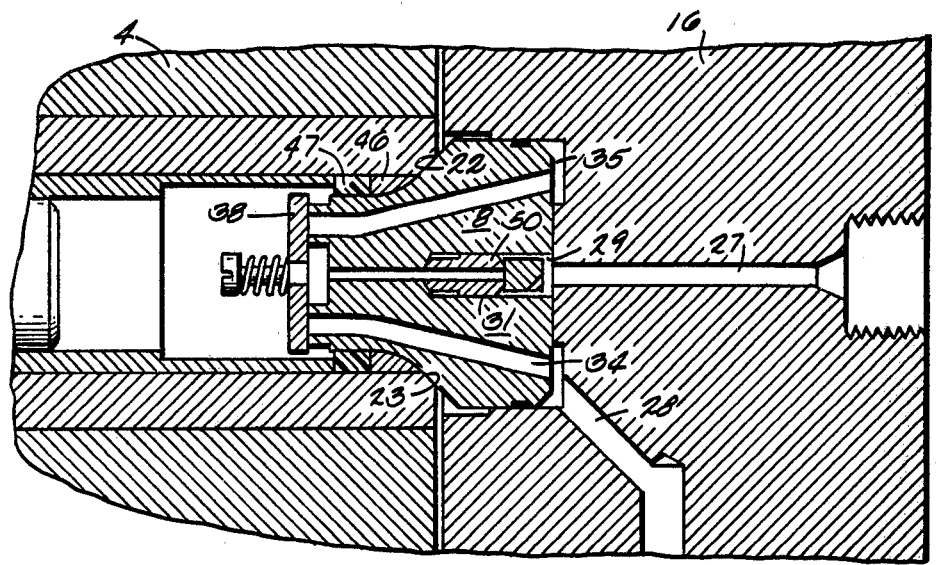
FIG. 4 is sectional view similar to FIG. 2 but showing a check valve insert having a flat high pressure valve seat in lieu of the ball seat shown in FIG. 2.
Figure 6:
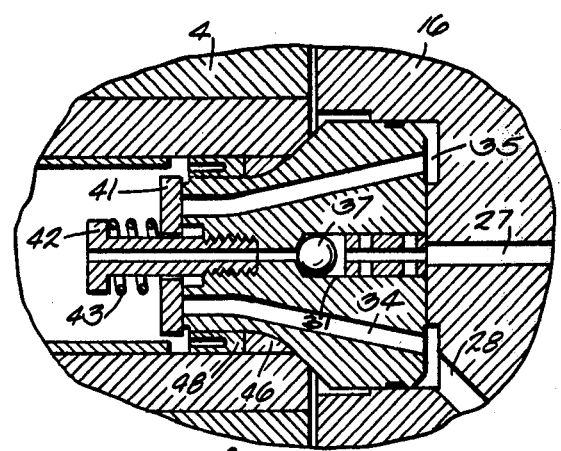
FIG. 6 is an enlarged sectional view of the check valve insert with a modified means of resiliently securing the low pressure disc plate against the face of the check valve.

The check valve assembly 8, FIGS. 2, 4, 6, has a coaxial bore 30 having an enlarged portion for check means 31 positioned therein. The seat 32 for the check means 31 lies in the plane defined by said mating annular tapered surfaces of the cylinder and check valve assembly. As the securing bolts 17 are tightened to pull the end head and cylinder together, the abutting surfaces 22, 23 are axially compressed resulting in a radial force component that compresses the check valve insert, which remains as a fixed compressive force that may be said to prestress the valve insert. Such compressive prestress opposes any hydraulic expansion forces acting within the valve insert. The bore 30 in the valve aligns with the bore 27 in the end head. The high pressure check means 31, 32, FIGS. 2, 6 comprises a ball check 31 and a cone shaped seat 32 for the ball check. The ball is limited in movement between the seat 32 and a flow through spacer 36.

The check valve 8 has a pair of inlet passages 33,34 extending generally axially therethrough. An annular recess 35 in end head 16 interconnects inlet passages 33, 34 and connects them to inlet passage 28 in the end head.

The check valve assembly or insert 8 includes a low pressure check plate 38 operable to admit supply fluid to the cylinder when the piston in the cylinder makes a return or suction stroke. As shown in FIGS. 2, 4, 6, the check plate 38 abuts the end face of the body of the insert, overlies the ports of inlet passages 33, 34 and has a coaxial bore in alignment with the discharge passage 30 in the valve insert. The check plate 38 is axially confined normally loosely in the abutting position so as to be displaced therefrom for the admission of supply fluid. Pressure within the cylinder acts to hold the check plate against the end face.

Means resiliently holding the low pressure check plate 38 in position as shown in FIG. 2 comprises two or more screws, 39 extending therethrough, spaced from the passages in the insert and threaded to the insert. Springs 40 under the heads of the screws 39 abut the face of the check plate 38 to urge it to seat on the face of the valve insert 8. In FIG. 6, the check plate 41 retaining means comprises a single hollow stud 42 threaded coaxially to the valve insert to permit discharge fluid to pass therethrough. A spring 43 mounted under the head of the stud 42 abuts the face of the check plate 41. The coaxial bore through the check plate 41 is slightly larger than the diameter of the stud 42.

Figure 3:
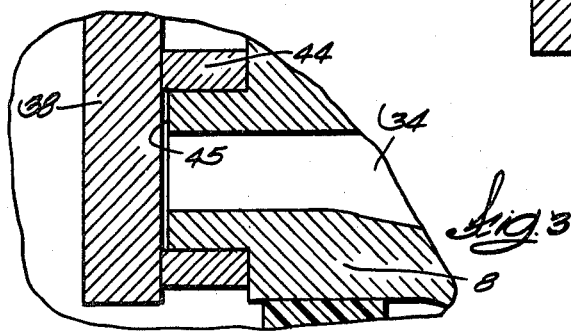
FIG. 3 is an enlarged view of a portion of the valve insert in FIG. 2 to show plastic ring sealing means surrounding an inlet port to the cylinder from the valve insert.

To assure a positive seal of the low pressure check plate 38, 41 on the insert to prevent escape of internal pressure through the inlets 33, 34 particularly for low values of internal pressure, the contact faces may be machined flat and highly finished or more economically the ports of the inlets 33, 34 may each be surrounded by an elastic plastic seal 44, FIG. 3 which axially extends slightly beyond the end face of the valve insert 8, on the order of 0.01 inch. The check plate 38, 41 initially makes sealing contact with the plastic seal, and as internal pressure builds up the plastic seal is depressed until the check plate seats against the metal face 45 of the check valve insert for metal to metal contact therewith.

Sealing means about the axially inner portion of the check valve insert between it and the bore the cylinder, includes a polymer seal 46 such as Delrin, shaped with an inclined face corresponding to the inclined face 22 of the valve insert for abutment therewith. The polymer seal 46 is backed by an elastomer with a follower ring type seal 47, which are axially confined by the end of the brass liner 15, FIGS. 2, 4.

Figure 7:
FIG. 7 is an enlarged cross sectional view through a portion of the annular double-walled metal seal that surrounds the valve insert within the cylinder, in FIG. 6.

This sealing means is modified in FIG. 6 by a hydraulic responsive metal seal 48 which may directly abut the inclined surface 22 of the valve insert 8, or abut a Delrin type seal 46. The metal seal 48 is a substantially rigid double-walled sleeve, FIG. 7, having walls spaced apart which are joined at one end. A cross-section through the member 48 looks like a U-shaped member. The open end of the U-shape is open to the interior of the cylinder. The inner wall of sleeve 48 fits closely to the surface of the valve insert, and the outer wall of the sleeve 48 fits closely to the wall of the bore 18 of the cylinder.

The double-walled sleeve 48 is normally readily inserted and removed. However, under high pressure between the walls of the double walled sleeve, the sleeve is resilient enough so the leading portions or lips thereof expand away from each other. As internal cylinder pressure builds up, the lip of the outer wall of the sleeve follows the expansion of the cylinder and makes a fluid tight engagement therewith. Similarly, as internal cylinder pressure builds up, the lip of the inner wall of the sleeve follows the surface of the valve insert to make a fluid tight engagement therewith. The walls of the sleeve, under high internal pressure, may be said to freeze respectively, on the surfaces of the bore of the cylinder and on the surface of the valve insert, and when such pressure is absent the lips of the sleeve relax so the sleeve makes its normal close fit with the valve insert and the cylinder.

Figure 5:
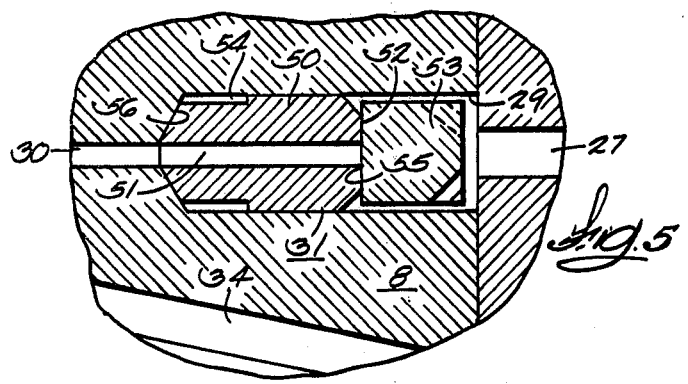
FIG. 5 is an enlarged view, taken from FIG. 4, of the high pressure check.

The check valve assembly, FIGS. 4, 5, has a high pressure check means 31 provided by a fixed member 50 having a flat seat 52 and by a movable member 53 having a flat face 55 for abutment with seat 52. Fixed member 50 has a coaxial bore 51 therethrough aligned with bore 30. The bottom end of bore 29 and of fixed member 50 are each conically shaped and in mating seating engagement. The check valve seat member 50 is retained in bore 29 by a plastic ring 54 that is press fitted thereon adjacent its conical end, and the seat member 50 is pressed into the bore 51.

Movable member 53 of the check means 31 is loosely fit in the bore 29 so that the higher of the pressures on opposite ends displaces the movable member. When subject to the back pressure from the system, line 27, the movable member 53 has its face 55 sealing on flat seat 52, and fixed member 50 is urged on its angled seat 56. When the intensifier pumps fluid from the cylinder 4, the movable member is displaced from the seat.

There is clearance between the bore 29 and the fixed and movable cylindrical members 50, 53 therein, and this clearance results the bore 29 always being subject to the pressure of the system, as reflected in line 27.

In either case high pressure fluid of the system exists in the bore 29 about the high pressure check valve means. Whereas the cyclic pumping pressure exists in bore 29, 30, within the valve insert and surrounds the portion of the valve insert that extends within the end of the intensifier cylinder. The net effect is that any tension forces of expansion due to cyclic pressures within the coaxial bore of the valve insert are opposed by compressive forces on the valve insert, and reduces fatigue forces or fatigue loading of the check valve.

We claim:

1. A check valve partially inserted in an end of an intensifier cylinder and partially in an end head for said cylinder, said intensifier cylinder having a piston for reciprocating therein to make a pumping stroke and a suction stroke that alternately intensifies the pressure of a low viscosity fluid for passage through a coaxial discharge passage through said check valve and a supply of low pressure low viscosity fluid for passage through an inlet passage spaced laterally of said high pressure discharge passage through said check valve;

said cylinder having an end with an annular surface tapered inwardly to a bore of said cylinder;

said check valve having a small diameter portion extending within said cylinder, a large diameter portion extending out of said cylinder, and an intermediate portion having a tapered annular outer surface joining the cylindrical surfaces of said small and large diameter portions and mating with said tapered end surface of said cylinder, said small diameter portion that extends within said cylinder defines an annular space therebetween, said large diameter portion extends into a recessed bore in said end head and in abutment with a bottom of said recessed bore in said end head;

an annular member fitted in said annular space between said small diameter portion of said check valve and said cylinder and in mating abutment therewith, internal fluid pressure within said cylinder and said annular space acting axially on said annular member urging said annular member axially toward the end of said cylinder in fluid tight engagement with said check valve and said cylinder;

a valve seat located within said high pressure discharge passage intermediate the ends thereof at a point within a radial plane through an inner edge of abutment of said tapered surfaces of said cylinder and check valve, a check-member on said valve seat operates to discharge high internal pressure fluid through said coaxial discharge passage and to block discharged fluid from returning to said cylinder;

a check plate over the internal end face of said check valve, said check plate having a coaxial bore therethrough open to said discharge passage, said check plate resiliently mounted on said end face and held thereagainst by the pressure of fluid within said cylinder when it exceeds the pressure of supply fluid to block a port of said inlet passage and being displaced from said end face by the pressure of supply fluid when it exceeds the pressure within said cylinder;

bolt means axially securing said end head to said cylinder to force said end head against the check valve to axially compress said check valve and hold said mating tapered surfaces of said check valve and said cylinder against each other under compression force and a radial component of said compression force extends on and through said check valve in the radial plane of said abutting mating tapered surfaces;

the small diameter portion of said check valve is subject to the alternating high pressure within said cylinder, within said coaxial discharge passage up to said valve seat, and on the outer cylindrical surface of said small diameter portion of said check valve, whereby the radial compression forces within said cylinder of said alternating high pressure offset the radial tension forces thereof in said coaxial discharge passage;

the large diameter portion of said check valve being outward of said valve seat is subject only to a constant high pressure and not to an alternating high pressure in the coaxial discharge passage and is therefore not subject to alternating stresses;

and the intermediate portion of said check valve within the radial plane of said mating tapered surfaces which radial plane includes said valve seat is a narrow radial plane through said check valve and is under a constant prestressed compression by said radial component of said axial compression forces on said tapered surfaces of said check valve and cylinder;

whereby the construction and arrangement of said cylinder and check valve minimize fatigue stresses in said check valve due to cyclic loading of high pressure in said cylinder and check valve.

2. A check valve and an intensifier cylinder as described in claim 1 wherein check valve portion within said cylinder has an end face with an annular groove about a port for the inlet passage for low pressure supply fluid, an annular plastic seal disposed in said annular groove and normaly axially extending beyond said end face, and said check plate initially seating on said plastic seal and as pressure builds up within said cylinder during a pumping stroke of the piston, the check plate axially deforms said plastic seal and seats on said end face.

* * * * *